April 1, 1969  J. M. PHINNEY  3,435,694
TURBINE-POWERED MARINE DRIVE

Filed Aug. 25, 1966

INVENTOR
JOHN M. PHINNEY

BY

ATTORNEY

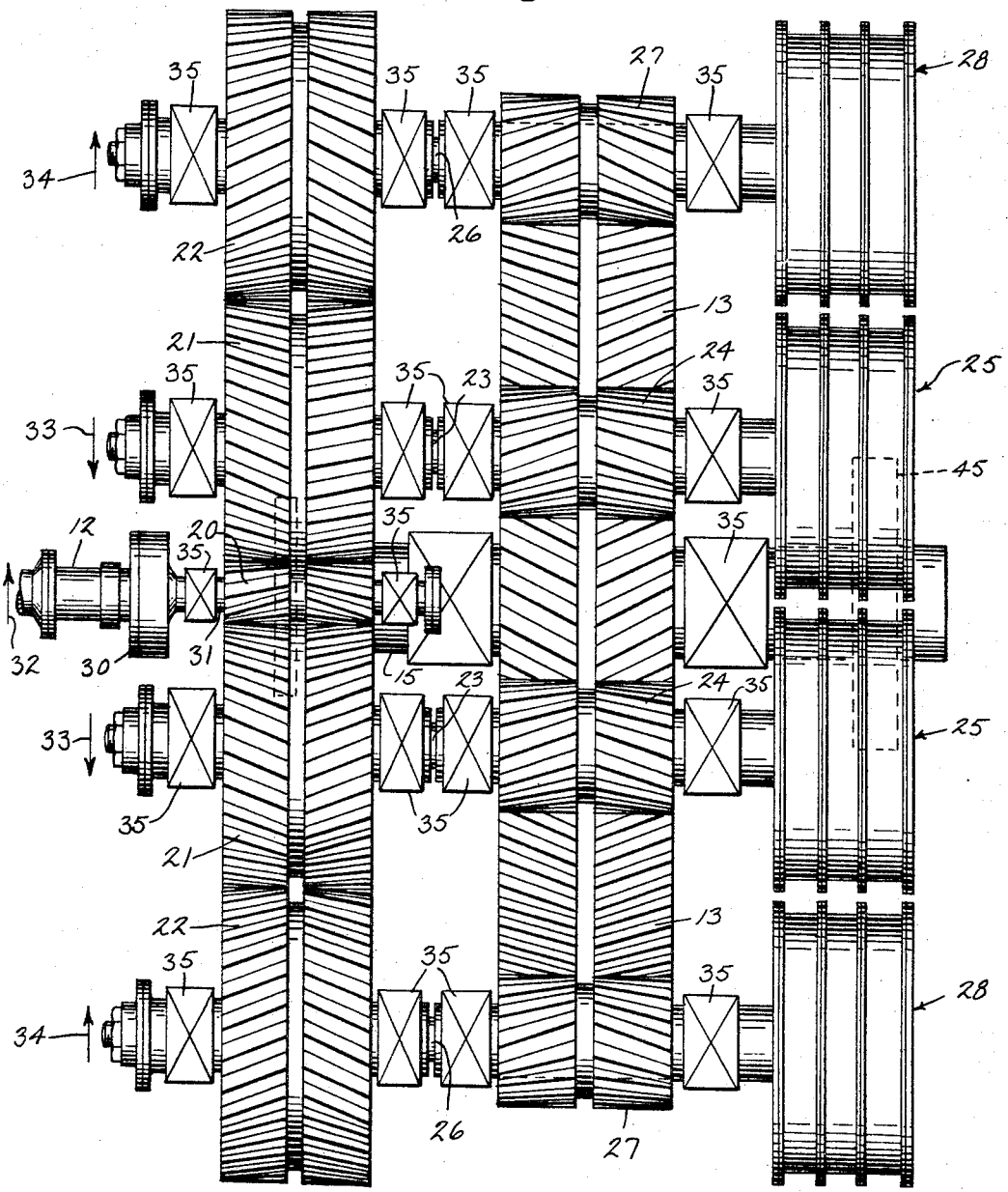

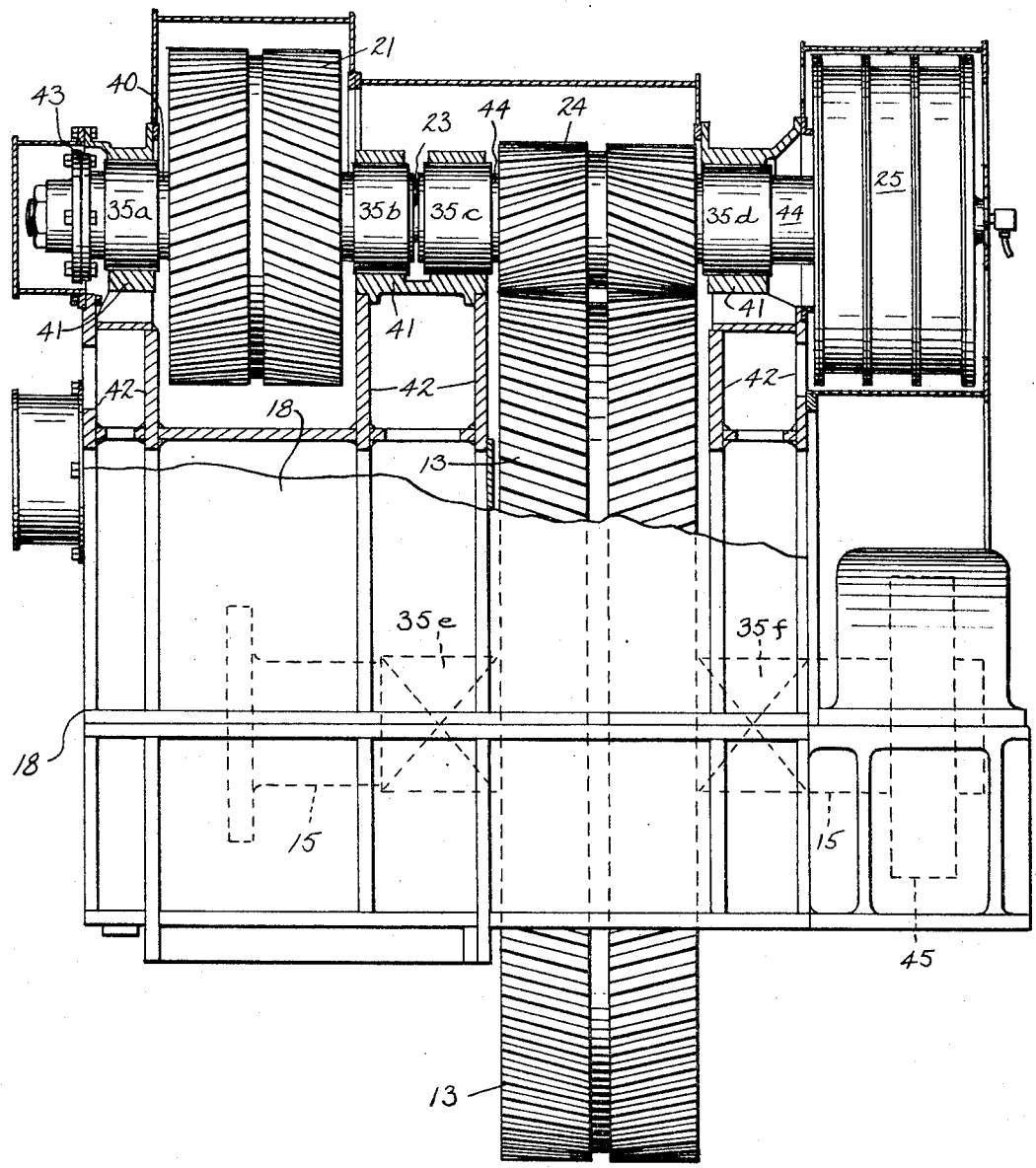

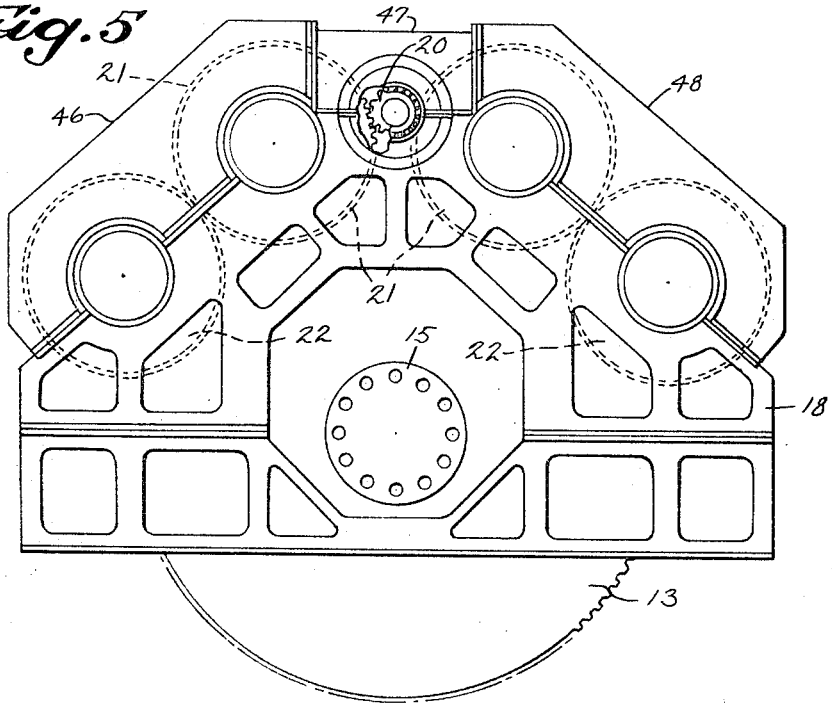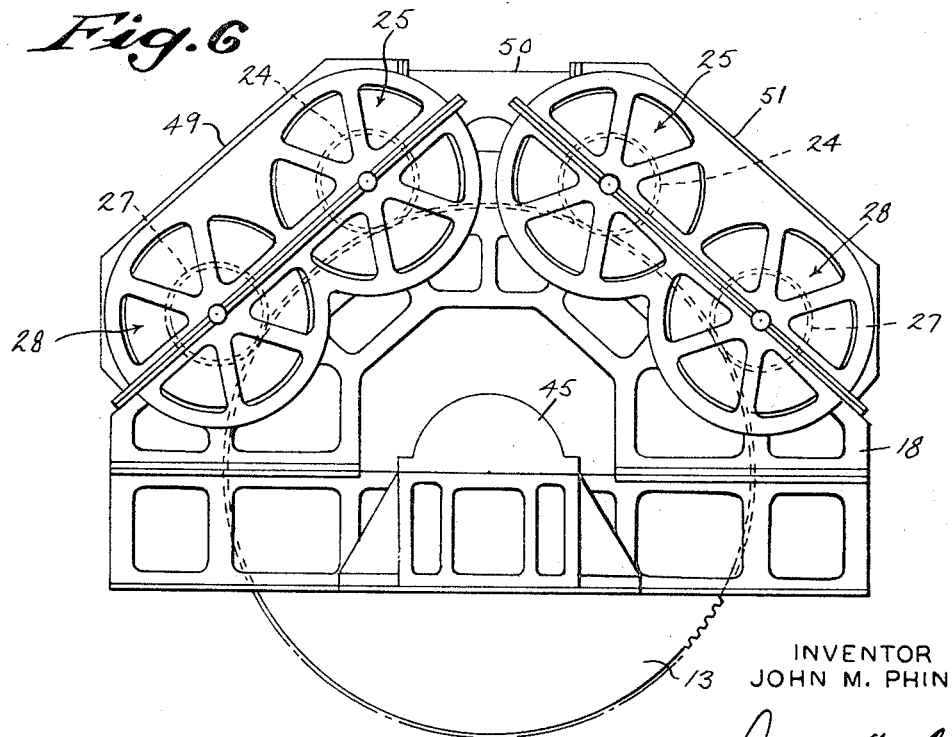

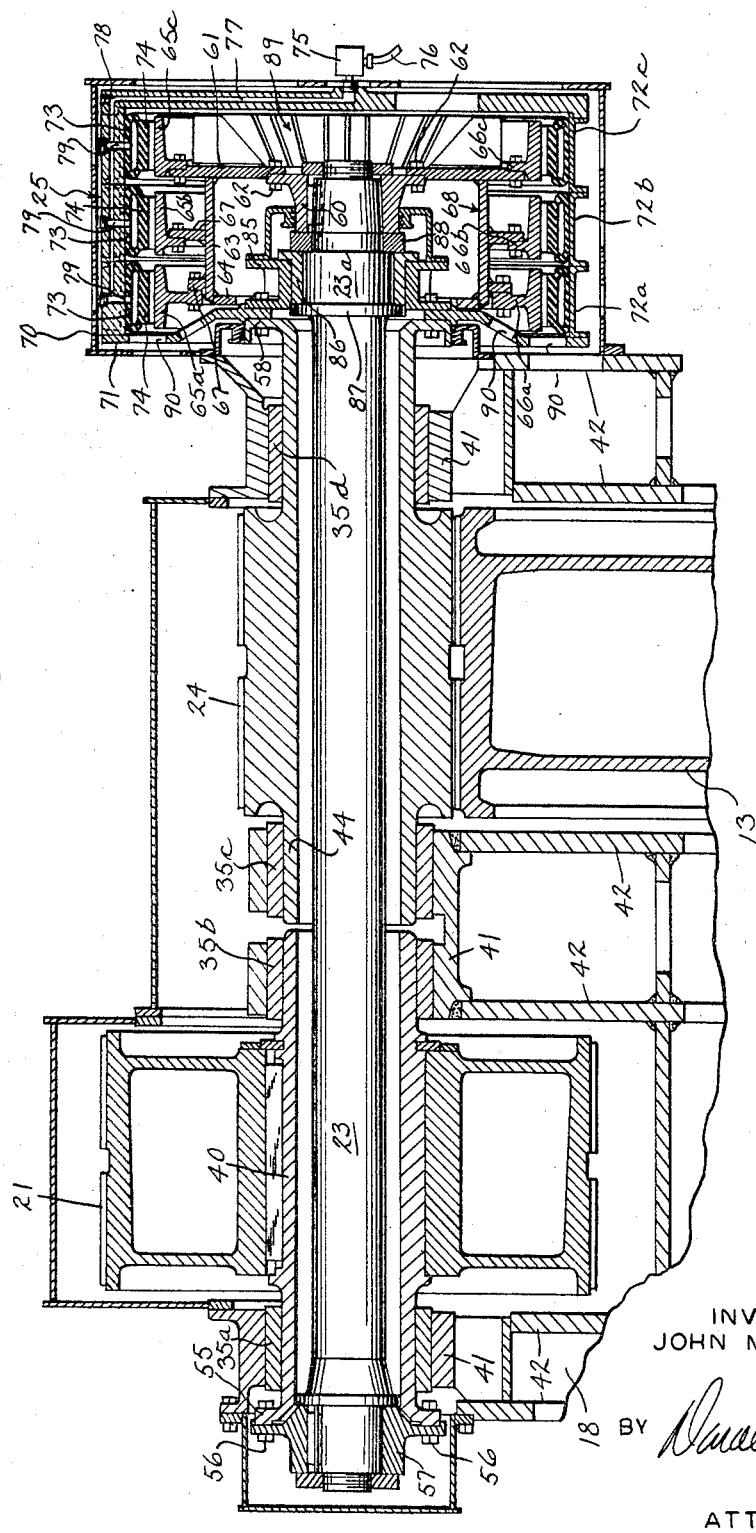

3,435,694
TURBINE-POWERED MARINE DRIVE
John M. Phinney, Milwaukee, Wis., assignor to The Falk Corporation, Milwaukee, Wis., a corporation of Wisconsin
Filed Aug. 25, 1966, Ser. No. 575,060
Int. Cl. F16h 3/14
U.S. Cl. 74—361　　　　　　　　　　　　　　　2 Claims

ABSTRACT OF THE DISCLOSURE

An apparatus for coupling an aircraft type gas turbine engine to a forward and reverse transmission for use in a ship. The movable parts of the clutches are attached to the output shaft so as not to be affected by the high speed of the turbine input.

---

This invention relates generally to marine drives including a prime mover driving a propeller shaft through a set of speed reducing gears, using air actuated drum clutches for selected engagement of certain gears in the set with the gear on the propeller shaft. More specifically, this invention relates to a new mode for arranging the elements of the air actuated clutches relative to the gears in the set so as to thereby render practical, for what is believed to be the first time, the use of a free turbine driven by a high speed aircraft type gas turbine as the sole prime mover in a marine drive.

The problem

A gas turbine of the type which I now desire to utilize in a marine drive has a gas generator in which fuel is mixed with air and burned to produce a high energy gas stream that drives a free turbine, i.e. a turbine which has no mechanical connection with the gas generator. A gas turbine of this type operates at a high r.p.m. in its normal full power operation and, because of its construction, also has a high direct drive idle r.p.m. It is this latter characteristic which makes it difficult to use as the sole type of prime mover in a marine drive because it requires that the clutches in the drive be "slipped," i.e. only partially engaged, to enable a ship to run at low speeds such as are necessary for the ship to operate, for example, unassisted in a harbor area. In other words, for reasons of marine maneuverability and low speed navigation, it is necessary that the marine drive allow operating a ship at a speed below the direct drive idle speed.

The prior art

However, the prior art manner of arranging air actuated drum clutches in a marine drive has been found impractical for use with a gas turbine as the prime mover. Air actuated clutches have two rotatable elements, one of which carries one or more rubber annular glands that are expanded or inflated with air to establish a driving connection between the members of the clutch. The speed reducing gear train in a marine drive can be regarded as having two branches: a first branch which leads from the prime mover to a clutch member and a second branch which leads from the other coacting clutch member to the driven gear on the propeller shaft. In the usual prior art arrangement, the first branch of the gear train leading from the prime mover was connected to the clutch member which carried the expandable glands. When this arrangement was used with the high speed gas turbines, however, it was found that an unstable condition would be produced when the drive was operated with the clutches in a slipping condition.

The instability of this prior art air clutch installation is explained as follows. If we ignore the pressure needed to overcome the elastic resistance of the clutch glands, the air pressure required for any given clutch operating condition will consist of two increments, one being the pressure needed to overcome centrifugal force (since the gland or glands are rotating elements) and the second being the pressure needed to transmit torque for the particular operating condition. If it is desired to engage the clutch and drive the propeller at some slip speed, starting with all clutches disengaged and the turbine at idling speed, clutch air pressure must be raised to the value necessary to overcome centrifugal force to obtain contact between the gland shoes and friction drum. As soon as contact occurs, however, the clutch will transmit torque and the turbine speed will decrease; since the air pressure to the clutch is constant, this reduces the air pressure increment needed to overcome centrifugal force and thereby makes available a higher net pressure increment to transmit torque. This in turn will produce a larger decelerating torque acting on the turbine and further reduce its speed. This process of decreasing speed and increasing torque producing pressure will continue until the turbine train and propeller train synchronize at the direct drive idle speed.

Alternately, starting from a direct drive condition, if it is desired to reduce propeller speed below the direct drive idle to some speed requiring clutch slip, the clutch air pressure must be reduced to a value below that at which the clutches start to slip. As soon as the clutches start to slip, the torque which has been holding the turbine below its normal free running idle will be reduced and the turbine will accelerate; this raises the clutch air pressure required to overcome centrifugal force and thereby decrease the net increment available for transmitting torque. The turbine speed will increase further until the increment to overcome centrifugal force exceeds the air pressure to the clutch glands and the clutches will then disengage, freeing the turbine to return to its normal idle speed.

Difficulties similar to the foregoing would also exist if some constant slipping speed were established and anything happens to disturb the turbine speed or clutch characteristics, such as a change in coefficient of friction due to clutch lining temperature change or a major change in propeller speed resulting from its being partially lifted from the water or striking some restraining object.

Present invention

This invention is based upon the discovery that high speed gas turbines can be adapted for use as the sole type of prime mover in a marine drive merely by reversing the traditional arrangement of the clutches in the drive, specifically, by arranging the clutches with the clutch member carrying the expandable glands connected to the propeller branch of the drive instead of being connected to the turbine branch.

It has been found that this mode of arrangement overcomes the difficulties noted above with gas turbines in marine drive installations because the clutch speed changes with the propeller speed instead of with the prime mover speed and normal, satisfactory control is obtained.

Some of the main objects of this invention are to provide a marine drive in which a high speed gas turbine can be utilized effectively for marine propulsion; to provide a marine drive incorporating air inflatable drum clutches with the clutch elements arranged in such fashion as to allow a gas turbine to be used as the sole type of prime mover; and to combine gas turbines in marine drives having air actuated drum clutches to allow slipping of the clutches to permit continuous operation at speeds below the idling speed of the prime mover and which will permit maintenance of a set operational speed requiring clutch slip, both due to the clutches being arranged in such a manner as to provide increased torque as speed is decreased at constant clutch gland air pressure irrespective of the prime mover speed. Related objects which follow from the present invention are to provide a marine drive of the character described which has divided power paths; which has both forward and reverse drives; and which has no axial restraint on the clutches when disengaged or slipping to thereby allow the gears attached to the clutch elements to move axially and properly center themselves in relation to the mating gears during operation. A more specific object is to provide the particular new or improved details of construction hereinafter claimed.

The foregoing and other objects will appear from the description which follows in which reference is made to accompanying drawings that form a part hereof and in which there is shown, by way of illustration and not of limitation, a presently preferred form in which this invention may be practiced. This will be described in sufficient detail to enable those skilled in the are to comprehend this invention, but it is to be understood that other embodiments of the invention may be devised and that changes in the embodiment described herein can be made by those skilled in the art without departing from the true scope of the invention. The same reference numeral refers to the same part throughout the several drawings, in which:

FIG. 3 is a top schematic view showing the gears in the drive;

FIG. 4 is a side view also showing the gears in the drive;

FIGS. 5 and 6 are stern and forward views respectively of the marine drive; and

FIG. 7 is a detailed sectional view showing a typical clutch arrangement in the marine drive.

FIGS. 1 AND 2

Figure 1:
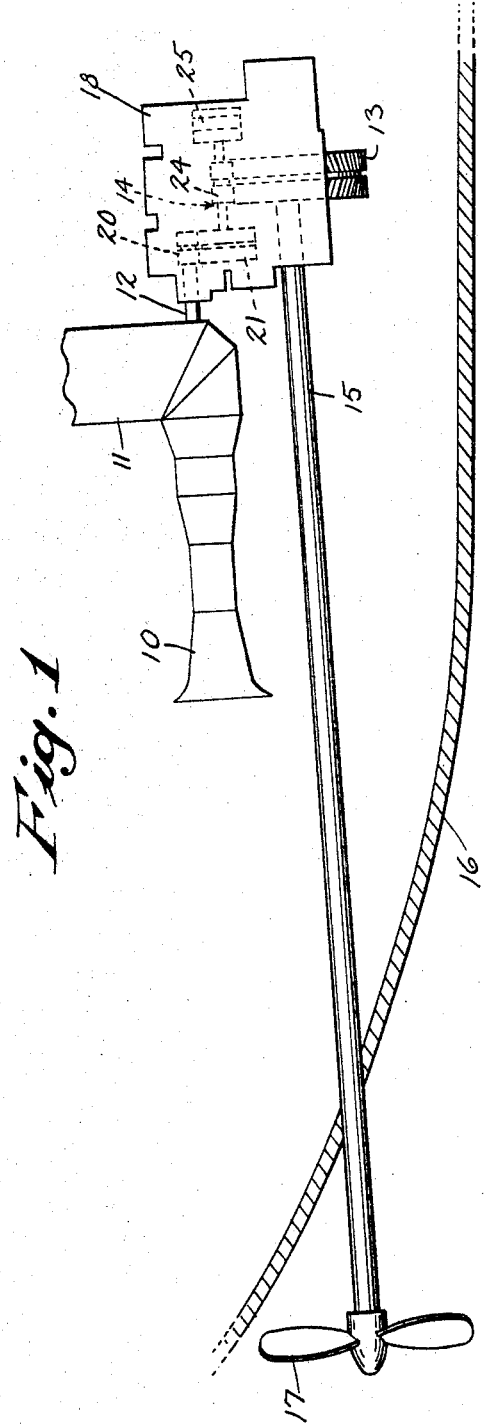
FIG. 1 is a side view, with parts broken away and partly in section, of a ship incorporating a marine drive according to the present invention.
Figure 2:
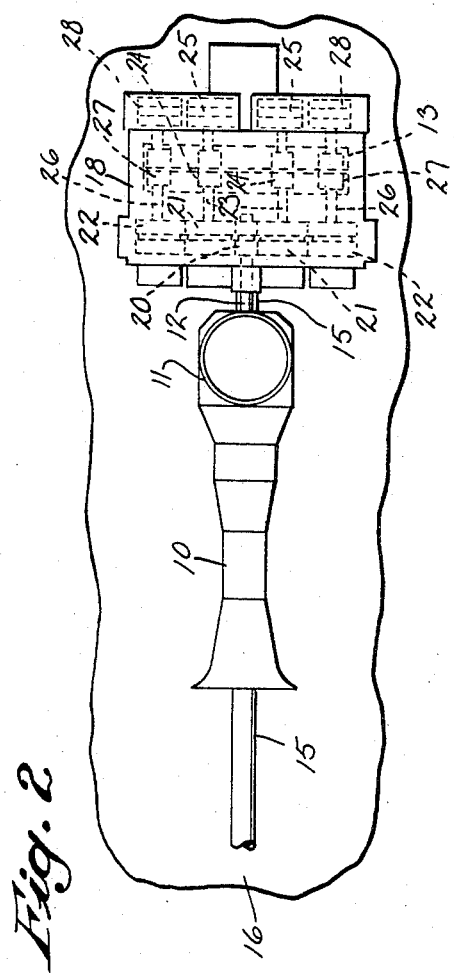
FIG. 2 is a top view of part of the marine drive of FIG. 1.

FIGS. 1 and 2 schematically illustrate a marine drive of the type to which this invention relates. The marine drive comprises a gas turbine 10 (having an exhaust stack 11) having a drive shaft 12 that drives a large propeller gear 13 through a speed reducing transmission indicated generally by the numeral 14. The propeller gear 13 is connected to a propeller shaft 15 which passes through the hull 16 of the ship and carries a propeller 17 at its outer end. A housing 18 encloses the gear train and other elements associated with the drive and also provides support for the bearings of many of the shafts carrying the several gears and pinions in the drive.

The speed reducing gear transmissions 14, which will be described in greater detail in connection with the next drawing, includes a high speed pinion 20 connected to the drive shaft 12, which drives a set of first reduction gears (see FIG. 2) consisting of a pair of inboard reduction gears 21 and a pair of outboard reduction gears 22. The gears 21 and 22, which are of the same size, are arranged with the gears 21 on opposite sides of and in mesh with the pinion 20 and with each gear 22 positioned outboard of and in mesh with a gear 21. Each gear 21 is connected to a shaft 23 which drives a low speed pinion 24 through a clutch 25. Similarly, each gear 22 is connected to a shaft 26 which drives a low speed pinion 27 through a clutch 28. The low speed pinions 24 and 27 mesh with the propeller gear 13. This type of gear transmission is a well-known arrangement.

In all the drawings, the gears and pinions are shown as being of the herringbone type, although other tooth forms can be utilized.

FIG. 3

Turning now to the detailed view of the gear transmission 14 as depicted in FIG. 3, the drive shaft 12 from the turbine 10 is connected through a coupling 30 to the shaft 31 which carries the high speed pinion 20. A turbine such as the turbine 10 is constructed to rotate in only one direction, counterclockwise as shown by the arrow 32 in FIG. 3. With the clutches 25 engaged and clutches 28 disengaged, the inboard first reduction gears 21 and low speed pinions 24 will rotate in the clockwise direction shown by the arrows 33 to drive the propeller gear in a counterclockwise direction; in this condition, the gears 22 and their associated low speed pinions 27 merely idle due to the disengagement of the clutches 28. This connection will drive the ship in one direction, say forward, then when the clutch engagement is reversed, so that clutches 25 are disengaged and clutches 28 engaged, the gears 22 and low speed pinions 27 will rotate in a counterclockwise direction as shown by arrows 34 to rotate the propeller gear in the opposite direction, e.g. astern, and the gears 21 and pinions 24 act as idle gears.

The several bearings 35 in which various shafts are journaled are supported in walls of the housing 18 which are not shown in FIG. 3.

FIGS. 4–6

These drawings show, respectively, side, aft, and forward views of the gear transmission 14 so as to clarify its arrangement in the housing 18.

Turning first to FIG. 4, a gear 21 (the upper gear 21 in FIG. 3) is shown as being carried on a hollow shaft 40 journaled in bearings 35a and 35b which are supported in bearing retainers 41 attached to vertical walls 42 of the housing 18. A shaft 23 extends through the hollow shaft 40 and is coupled thereto, as at 43, which will be shown in greater detail in FIG. 7. The low speed pinion 24 is formed as a toothed portion of a second hollow shaft 44 which is journaled in bearings 35c and 35d also supported in retainers 41 carried by walls 42 of the housing. The shaft 23 extends through the hollow shaft 44 and is connected to one of the members of the clutch 25. The second hollow shaft 44 is connected to the other member of the clutch 25 so that upon engagement of the two clutch members, the pinion 24 drives the propeller gear 13. This construction will be described in further detail in connection with FIG. 7. The propeller shaft 15 is journaled in bearings 35e and 35f supported in the housing 18 which carry the radial loads. Axial thrust is carried by a thrust bearing 45 which may be of the Kingsbury type well known to the marine drive art.

The view of the aft end of the marine drive in FIG. 5 shows the intermeshing of the high speed pinion 20 with the inboard reduction gears 21 positioned one on each side of the pinion and the intermeshing of each gear 21 with an outboard reduction gear 22. Suitable covers 46, 47 and 48 secured to the housing 18 enclose the pinion and reduction gears. In the view of the forward end of the drive in FIG. 6, the arrangement of the clutches and meshing of low speed pinions 24 and 27 with the propeller gear 13 are shown, the clutches being enclosed in covers 49, 50, and 51 attached to the housing 18

FIG. 7

The preceding description in connection with FIGS. 1–6 has set forth a typical marine drive transmission and has been intended as prologue to the description which is now presented in relation to FIG. 7 to establish a typical setting in which this invention is to be used. As mentioned in the first part of the specification, the use of an aircraft type gas turbine such as the turbine 10, in a marine drive, has presented problems due to the high idle r.p.m. of such a turbine and the attendant unstable characteristics when it is desired to slip the clutches in marine use. This invention provides a new mode of arranging the clutch elements in a drive vis-a-vis the propeller gear and the prime mover so that the turbine can be made useful for ship propulsion, and involves a reversal of the traditional manner in which clutches have been utilized in marine drives.

FIG. 7 shows in detail the connection between a first reduction gear 21 and a low speed pinion 24, the arrangement of the other gear 21 and its pinion 24 as well as that of the gears 22 and their respective low speed pinions 27 being the same as the one illustrated. The first speed reduction gear 21 is keyed, or otherwise joined to the hollow shaft 40 that is journaled in bearings 35a and 35b. At one end, the shaft 40 has an annular flange portion 55 which is connected, as by bolts 56, to a coupling 57 keyed to the shaft 23 which extends through the hollow interior of the shaft 40. The shaft 23 also extends through the hollow portion of the second hollow shaft 44 which carries the low speed pinion 24 and has an end portion 23a that projects beyond the annular flange 58 of the second hollow shaft 44.

To the end portion 32a of the shaft 23, there is secured, as by key, a hub member 60, and a first ring 61 is joined to the hub member 60 as by the bolts 62. An annular rim 63 is joined to the first ring 61 and a second ring 64, spaced from the first ring, is secured to the opposite end of the rim 63 so that the rim and two rings form a drum assembly 68. A set of three annular rims 65a, 65b, and 65c each having an internal radial flange 66a, 66b, and 66c, are carried on the drum assembly, with the rims 65a and 65b bolted to rings 67 and 68, respectively, secured to the rim 63 and the flange 66c of rim 65c bolted to a peripheral portion of the first ring 61 which extends beyond the rim 63. The composite assembly comprising rings 61 and 64, rim 63 and outer rims 65a, 65b and 65c form one rotatable member of the clutch 25, which may be considered as an internal drum member.

The second rotatable member of the clutch 25 is a bell shaped member indicated generally by the number 70 comprised of a ring 71 bolted to the flange 58 of the second hollow shaft 44, and an annular rim formed by a series of three annular channels 72a, 72b and 72c connected together along their flange portions. Firmly joined, as by vulcanization, to each channel 72 is a rubber annular gland 73 which is hollow and expandable upon being inflated by air or other suitable fluid. The glands 73 are shown in an unexpanded condition in FIG. 7 and the clutches are disengaged. The inner surface of each expandable gland 73 carries a wear shoe 74 so that when the glands expand, each shoe contacts an annular rim 65 of the other clutch member so as to effect driving engagement between the two clutch members. Compressed air to actuate the glands 73 is supplied through a rotary air joint 75 which is connected to a suitable source of compressed air, not shown, through the air supply and exhaust conduit 76. From the joint 75, the air passes through a radial air passage 77 into a cross passage 78 from which passages 79 lead into the interior portion of each gland 73.

The second or outer member 70 of the clutch includes an annular channel ring 85 which is secured to the ring 71 and flange portion 58 of the second hollow shaft 44. The shaft 26 is journaled on a sleeve bearing 86 and is axially restrained between a thrust shoulder 87 and a thrust collar 88. A fan assembly 89 is included to provide a cooling air stream for the clutch, and openings 90 are formed in the ring 71 to allow for air circulation.

Conclusion

There has thus been described a marine drive using a gas turbine and air-actuated drum clutches which incorporates a new clutch arrangement to thereby obviate certain difficulties experienced with gas turbines in marine drives when the usual clutch arrangement was attempted. In a prior art arrangement, the air glands 73 would be carried on the drum assembly 68, or other clutch member, connected to the gears in the prime mover branch of the drive; in contrast, with the arrangement of this invention, the air glands are carried by the clutch members 70 connected with the propeller branch of the gear drive. In the drive shown, the high speed pinion 20, and gears 21 and 22 comprise the branch leading from the prime mover to the clutch and the low speed pinions 24 form the branch leading from the clutch to the propeller gear 13.

With reference to the first pages of this description, the enhanced operation of the drive arrangement of this invention is explainable on the following basis. Because the rotational speed of the clutch glands is related to the propeller speed (instead of being related to the turbine speed in the prior art installations described above), this brings about unexpected improvements in the stability of the drive. With this new arrangement, again starting with the turbine at idling speed and all clutches disengaged, if it is desired to engage the clutch and drive the propeller at a selected slip speed, the clutch air pressure must be raised to a value necessary to transmit the required torque and overcome centrifugal force at that propeller speed. As soon as contact between the clutch members occurs, since the propeller and the clutch glands are not rotating, all of the pressure will be available to transmit torque and start the propeller turning. As the propeller speed accelerates, an increasing increment of the clutch pressure will be needed to overcome centrifugal force and a condition will be reached in which there is sufficient torque transmitted to maintain the propeller at the desired speed and support the clutch glands against centrifugal force. Throughout this process the turbine will be slowing down to produce the torque required but changes in the turbine speed will not affect the pressure balance in the clutch because the clutch pressure increment required to overcome centrifugal force will depend on the propeller speed instead of the turbine speed as was the case with prior art installations described previously. A stable drive condition with the clutches slipping is thus obtained. Alternately, starting from a direct drive condition, if it is desired to reduce propeller speed below the direct drive idle to a speed requiring clutch slip, the clutch air pressure will be reduced to the value required to transmit torque and meet the centrifugal force requirements. With the clutch pressure at this reduced level, the propeller is above the desired speed and more torque is required to maintain this initial propeller speed than is available because of the high centrifugal force requirement and the propeller will begin to slow down. As the propeller slows down, the clutch air pressure increment needed for overcoming centrifugal force will be reduced, increasing the pressure available for transmitting torque. This process continues until the torque on the propeller is adequate to maintain the propeller speed and meet the clutch gland centrifugal force requirements. Throughout this process, the turbine has been speeding up but its speed changes have not affected the air pressure requirement for the clutches.

In the case of a disturbance which reduces the propeller speed, such as the propeller striking a restraining object, the engaging pressure required by the clutch will drop and increase the air pressure available to produce torque, thereby restoring the prop to its original running speed. With a disturbance which increases the speed of the propeller, such as the propeller lifting out of the water due to wave action or a change in ballast, the engaging pressure requirement will increase and reduce the air pressure available for transmitting torque; at this higher speed, the torque required to drive the propeller will be greater than that now produced by the clutch, and this will result in the propeller slowing down to its original speed. Therefore, in either instance, any disturbance results in a new force upon the system which tends to restore the system to its previous operating conditions.

In addition to the foregoing control advantages of the present marine drive, it should also be noted from the drawings and the above description that the drive shown herein has all the thrust loads taken up at a single bearing station, herein the Kingsbury bearing in which the propeller shaft is journaled. Towards this end, the several gears, pinions and clutch members are arranged so as to have a limited degree of axial movement or float so that the gears can move axially and properly center themselves to their mating gears in the drive. Thus there are no thrust bearings in the housing supporting the marine drive since all of the thrust loads are taken up at the single bearing station. This feature provides for accurate alignment of mating gears and is an added utilitarian feature that is readily obtainable with the present marine drive. Also, although the drive is shown herein with a single screw, it is to be understood that the drive can be used with twin-screw systems. It is further to be understood that while no lubrication system for the marine drive is illustrated or described, a suitable system would be incorporated in the drive by anyone skilled in the art. Further, the drive illustrated has two power paths for both forward and reverse directions, although the present invention can be incorporated in other types of drives.

As indicated, this invention relates to a marine drive using at least one gas turbine as the prime mover. Gas of the type intended are internal combustion engines (not steam turbines) having a turbocompressor feeding air into a combustion chamber in which fuel is added and burned to create a high energy gas stream that is ducted through a first turbine that drives the above turbocompressor. The discharge from the first turbine is ducted to a second turbine connected to the output shaft and is used to produce power; there is no mechanical connection between the second turbine and the first turbine, hence the second is referred to as a "free turbine." Any fuel suitable for marine use can be employed. This type of gas turbine will usually have a full power output speed in excess of 1500 r.p.m. and a free running idle pseed of about 60% of the full power speed.

It is to be understood that it is intended to cover all changes and modifications of the example of this invention herein shown for the purposes of illustration which do not constitute a departure from the spirit and scope of this invention.

I claim:

1. In a marine drive including (1) a prime mover, (2) a drive train comprising a high speed pinion driven by the prime mover, first speed reduction gears driven by the high speed pinion, some of the first speed reduction gears arranged to rotate clockwise and others arranged to rotate counterclockwise to provide forward and reverse drive, a first shaft connected to each first speed reduction gear, a propeller gear carried on a propeller shaft, a low speed pinion for each first speed reduction gear arranged to mesh with the propeller gear, and a second shaft connected to each low speed pinion, (3) a clutch for each low speed pinion, each clutch including said first rotatable member connected to a first shaft and said second rotatable member connected to a second shaft, and at least one expandable air-actuated annular gland attached to one of the rotatable members of the clutch, the combination wherein:
(A) the prime mover includes a gas turbine and a free turbine driving an output shaft, said free turbine being mechanically disconnected from the gas turbine and driven by exhaust gas therefrom, and said output shaft being connected to the drive train; and
(B) each clutch is arranged with its expandable glands carried by the rotatable member which is connected to said second shaft connected to said low speed pinion in the drive.

2. In a marine drive including (1) at least one prime mover, (2) at least one propeller shaft and a propeller gear on each propeller shaft, (3) a speed reducing gear train for each propeller gear including speed reducing gears for driving each propeller gear in forward and astern directions and clutches having first and second rotatable clutch members, said speed reducing gear train including a first branch comprising gears driven by the prime mover and leading to a first clutch member and a second branch comprising gears driven from a second clutch member and leading to the propeller gear, said clutch including at least one expandable air-actuated gland attached to one of the rotatable clutch members, the combination wherein:
(A) the prime mover includes a gas turbine and a free turbine driving an output shaft, said free turbine being mechanically disconnected from the gas turbine and driven by exhaust gas therefrom, and said output shaft being connected to the speed reducing gear train; and
(B) each expandable air actuated gland of each clutch is carried by the second rotatable member of the clutch which drives the second branch of the speed reducing gear train.

References Cited

UNITED STATES PATENTS

| 1,151,762 | 8/1915 | Day | 74—361 |
| 1,754,325 | 4/1930 | Kingsbury | 308—160 |
| 2,892,356 | 6/1959 | Sidclair | 74—361 |
| 3,225,877 | 12/1965 | Gantt | 192—88 |
| 3,129,682 | 4/1964 | Penney. | |
| 3,234,902 | 2/1966 | Booth. | |

FOREIGN PATENTS 645,369   7/1962   Canada.

DONLEY J. STOCKING, *Primary Examiner.*

HENRY S. LAYTON, *Assistant Examiner.*

U.S. Cl. X.R.

192—74, 76, 88